W. E. FROST.
EGG TESTER.
APPLICATION FILED JUNE 18, 1914.
1,149,358.
Patented Aug. 10, 1915.
2 SHEETS—SHEET 1.
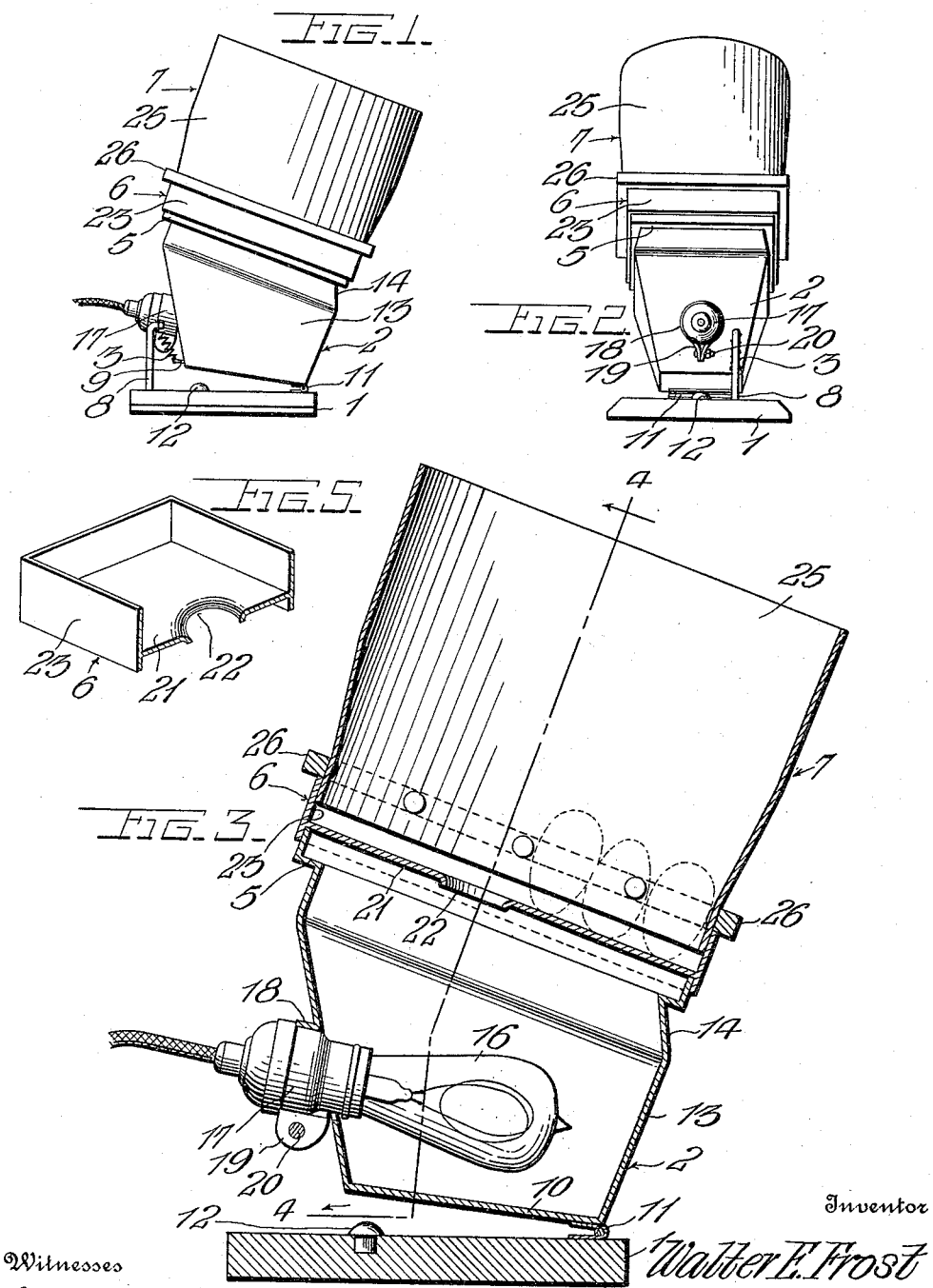
Witnesses
Edwin B. Hunt
Inventor
Walter E. Frost
By H. B. Willson & Co.
Attorneys

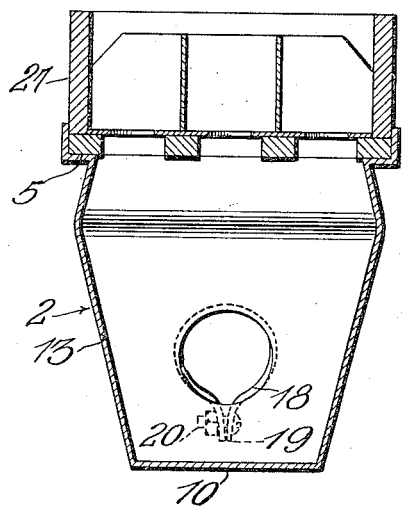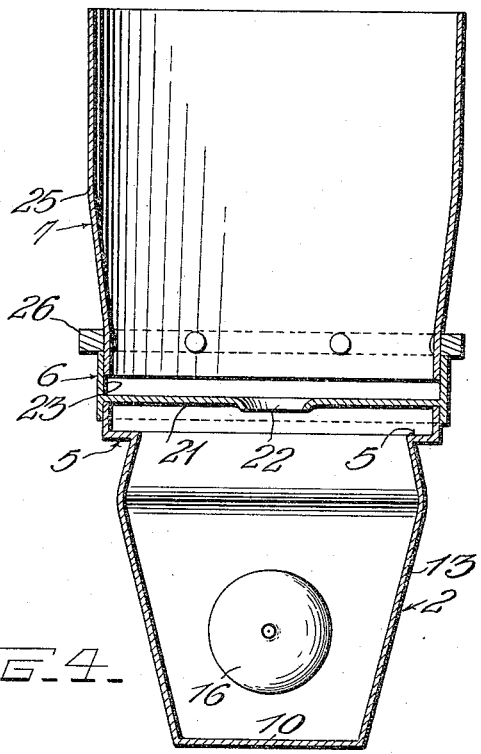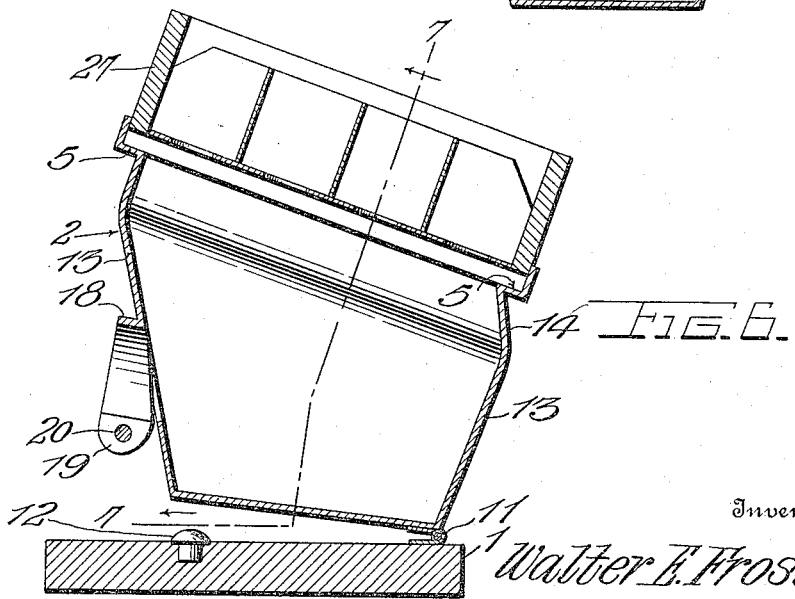

UNITED STATES PATENT OFFICE.

WALTER E. FROST, OF AUBURN, MAINE, ASSIGNOR OF ONE-THIRD TO AIME C. LEVEQUE AND ONE-THIRD TO JOSEPH P. CHEVALIER, BOTH OF LEWISTON, MAINE.

EGG-TESTER.

1,149,358.

Specification of Letters Patent.

Patented Aug. 10, 1915.

Application filed June 18, 1914. Serial No. 845,858.

*To all whom it may concern:*

Be it known that I, WALTER E. FROST, a citizen of the United States, residing at Auburn, in the county of Androscoggin and State of Maine, have invented certain new and useful Improvements in Egg-Testers; and I do declare the following to be a full, clear, and exact description of the invention, such as will enable others skilled in the art to which it appertains to make and use the same.

My invention relates to improvements in egg testers and has for its primary object to simplify the construction of devices of this character without sacrificing any of the advantages thereof; in fact, providing a device which possesses numerous advantages over other styles of testers.

A secondary object of the invention is to provide a yielding support for the tester whereby the eggs may be jarred for a purpose to appear.

A further object of the invention is to construct a light receiving receptacle in such a manner as to provide a number of light intensifying surfaces and to form the upper edge thereof in such a manner as to support an egg tray or an egg carrier as the case may be.

A further object of the invention is to construct said egg tray in such a manner as to allow the same to act, not only as a support for the egg being tested, but for a number of eggs to be tested.

Further objects of the invention are to provide a simple and efficient shield for use in connection with the device and to provide simple and efficient means for attaching an electric socket.

With these objects in view, the invention resides in certain novel features of construction and combination herein described and claimed and shown in the drawings wherein:—

Figure 1 is a side elevation of an egg tester constructed in accordance with my invention; Fig. 2 is an edge view thereof; Fig. 3 is an enlarged central vertical longitudinal section; Fig. 4 is a transverse section taken along the plane of the line 4—4 of Fig. 3; Fig. 5 is a sectional perspective view of a portion of the egg tray; Fig. 6 is a view similar to Fig. 3 showing the manner in which the upper edge of the light receptacle may be employed for the purpose of supporting an egg carrier; and Fig. 7 is a transverse section taken along the plane of the line 7—7 of Fig. 6.

In the accompanying drawings, I have shown my improved egg tester as comprising, in general, a base 1, a light receptacle 2 hingedly connected thereto, a spring 3 for yieldingly supporting one edge of said receptacle, an L-shaped offset 5, on the upper edge of the receptacle 2, an egg tray 6 resting upon said offset and a shield 7 resting upon an upstanding side wall of said tray.

The base 1 may be of any suitable formation and in fact may be a portion of a store counter and is provided with an upstanding post 8 whose upper end is turned laterally to provide a support for the upper end of the spring 3, the latter being here shown as of the helical type and having its lower end connected as at 9 to one of the lower edges of the bottom 10 of the receptacle 2, the opposite edge of said bottom being hingedly connected to the base 1 by any appropriate hinge 11. By reference to the drawings, it will be seen that the edge of the receptacle 2, to which the spring 3 is attached, is yieldingly supported above the base 1, but is allowed to swing around the hinge 11 as the spring 3 yields, a suitable bumper 12 being preferably provided for the purpose of preventing excessive downward movement on the part of said receptacle 2.

The receptacle 2 includes the bottom 10 and an upwardly and outwardly inclining surrounding wall 13 rising therefrom, said wall having its upper portion contracted by inclining the same inwardly and upwardly as indicated at 14 while the extreme upper edge of said wall is provided with the offset portion 5 which is L-shaped in cross section and which constitutes a support for the tray 6 and likewise for an egg carrier in a manner to appear.

By constructing the receptacle 2 in the above set forth manner, a number of reflecting surfaces are provided, said surfaces tending to intensify the rays of light which radiate from an electric bulb 16 which is located in the receptacle 2 and is carried by a socket 17, the latter projecting through an opening in the wall 13 and being secured in position by means of a substantially circular clamp 18 which is provided with a pair of ears 19 through which a clamping bolt 20 is passed to securely grip the socket. By reference to the drawings, it will be seen that the upper portion of the clamp 18 is united with the wall 13 while the lower portion thereof and the ears 19 are free to move when a nut is tightened upon the bolt 20.

As most clearly seen in Figs. 3 and 5, the above mentioned tray 6 comprises a flat metal plate 21 which is of suitable configuration and is provided with an egg receiving opening 22 near one end, the material around said opening being preferably curved downwardly for obvious reasons. The plate 21 is surrounded by an upstanding wall 23 which rises a suitable distance to provide an egg retaining flange while its lower portion depends from the plate 21 and is adapted to engage the outer side of the offset portion 5, when the tray is in position thereon as seen in Fig. 3, in which position said plate 21 is adapted to rest upon the extreme edge of said offset portion. By this formation of the tray 6, a number of eggs, indicated at 24 in Fig. 3, may be retained within said tray for the purpose of being tested one at a time. It will be noted that the tray inclines downwardly and forwardly, this being caused by the fact that the upper edge of the wall 13 is located in a plane lying at an acute angle to the bottom 10 and by the fact that the rear side of the receptacle 2 is supported at a higher level than the forward side thereof.

Adapted for use in connection with the device as above described, is the shield 7, the latter being in the form of a continuous flexible wall 25 having its lower end suitably shaped to fit within the wall 23 and being provided with a continuous stop 26 which limits its downward movement by coming in contact with the upper edge of said wall 23. This shield 7 is preferably formed of cardboard but it is evident that any suitable material may be employed.

With the parts as above described, the operation of the device is as follows: The tray 6 is removed from the device and may be used for the purpose of carrying the eggs to be tested from a crate to the testing device upon which the same is now arranged as above set forth and as shown in Fig. 3. The entire device is now jarred, this operation being necessary in order that the eggs may be jarred therefore rendering the testing operation more successful as it is a well known fact that eggs may be tested more accurately after shaking or jarring the same. It may here be explained however, that my improved tester is not designed for testing eggs to be used for hatching purposes although it may be adapted to this use provided no jarring is allowed. In testing the eggs in this manner, the shield 7 may be employed if necessary.

In Figs. 6 and 7 I have shown the manner in which the receptacle 2 may be employed for the purpose of yieldingly supporting an egg carrier 27, the latter being of common construction and forming no part of the present invention. In this connection it will be seen that the carrier 27 rests within the offset portion and upon the horizontal flange thereof.

From the foregoing description taken in connection with the accompanying drawings, it will be seen that I have produced an extremely simple egg testing device yet one which will be highly efficient in operation and which has numerous advantages over other devices of this character.

I have described my invention with considerable minuteness but I do not wish to be limited to details other than those amplified in the appended claims.

Having thus described my invention, what I claim as new and desire to secure by Letters Patent is:—

1. An egg tester comprising a light receptacle having an egg receiving opening, a hinge support for one side of said receptacle, and yielding means for controlling the movement of the hinge.

2. An egg tester comprising a light receptacle having an egg receiving opening, a fixed support, and a spring attached to said receptacle at its lower end and to said fixed support at its upper end.

3. An egg tester comprising a base, a light receptacle hingedly connected thereto and having an egg receiving opening, a post rising from the base adjacent the receptacle and an elastic connection between said post and the receptacle and yieldingly supporting a portion of the latter above the base.

4. An egg tester comprising a base, a substantially rectangular light receptacle hingedly connected at one of its lower edges to said base, a post rising from the base adjacent the opposite lower edge of the receptacle and a coil spring attached at one end to the post and at its other to said receptacle.

In testimony whereof I have hereunto set my hand in presence of two subscribing witnesses.

WALTER E. FROST.

Witnesses:
 FRED O. WATSON,
 R. J. STAPLES.

Copies of this patent may be obtained for five cents each, by addressing the "Commissioner of Patents, Washington, D. C."